Sept. 25, 1962 M. KRAKAUER ETAL 3,055,544
MULTILEVEL GRAVITY-FEED PACKAGE-MERCHANDISING MACHINE
Filed Oct. 20, 1958 5 Sheets-Sheet 1
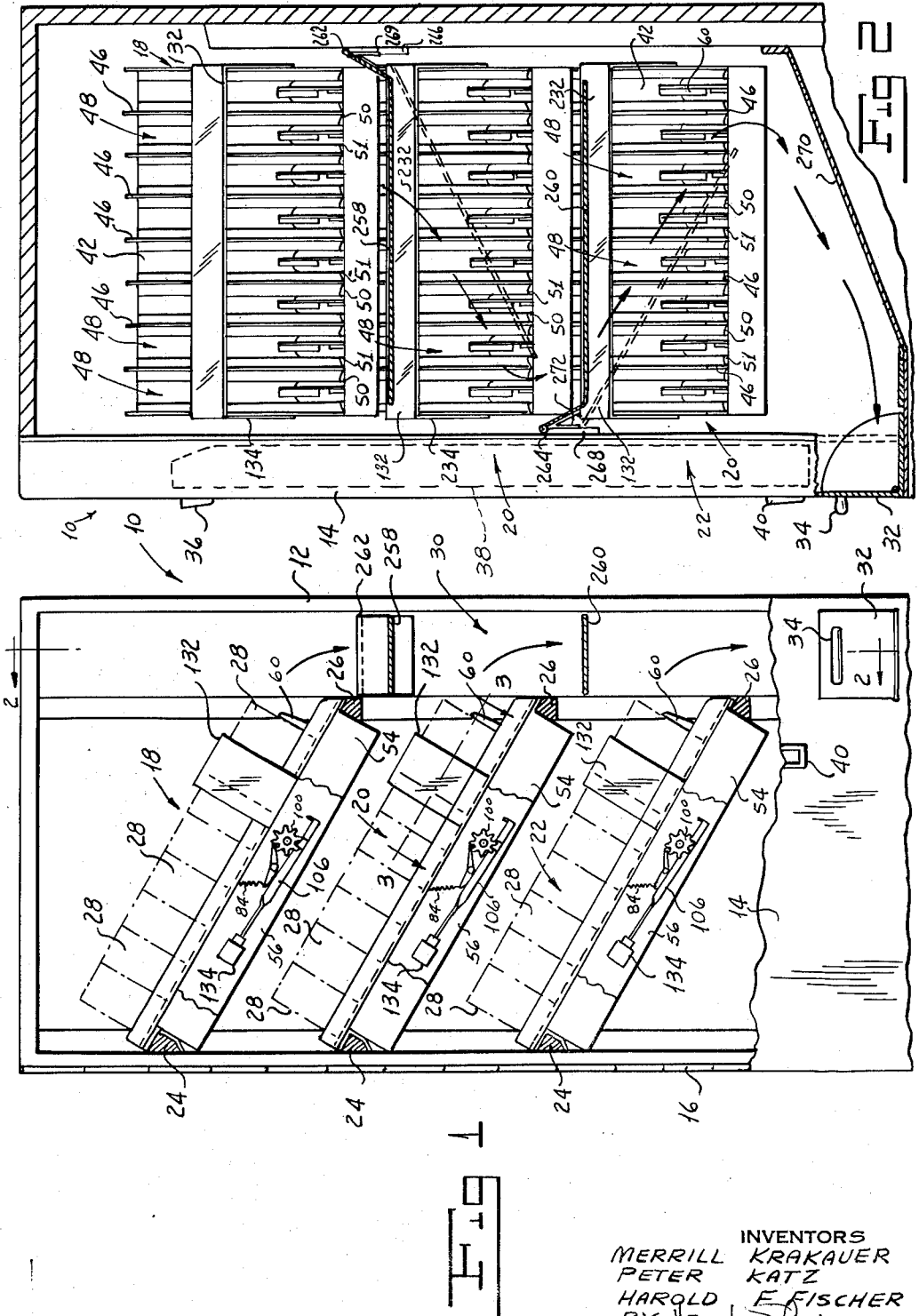
INVENTORS
MERRILL KRAKAUER
PETER KATZ
HAROLD F. FISCHER
BY
ATTORNEY

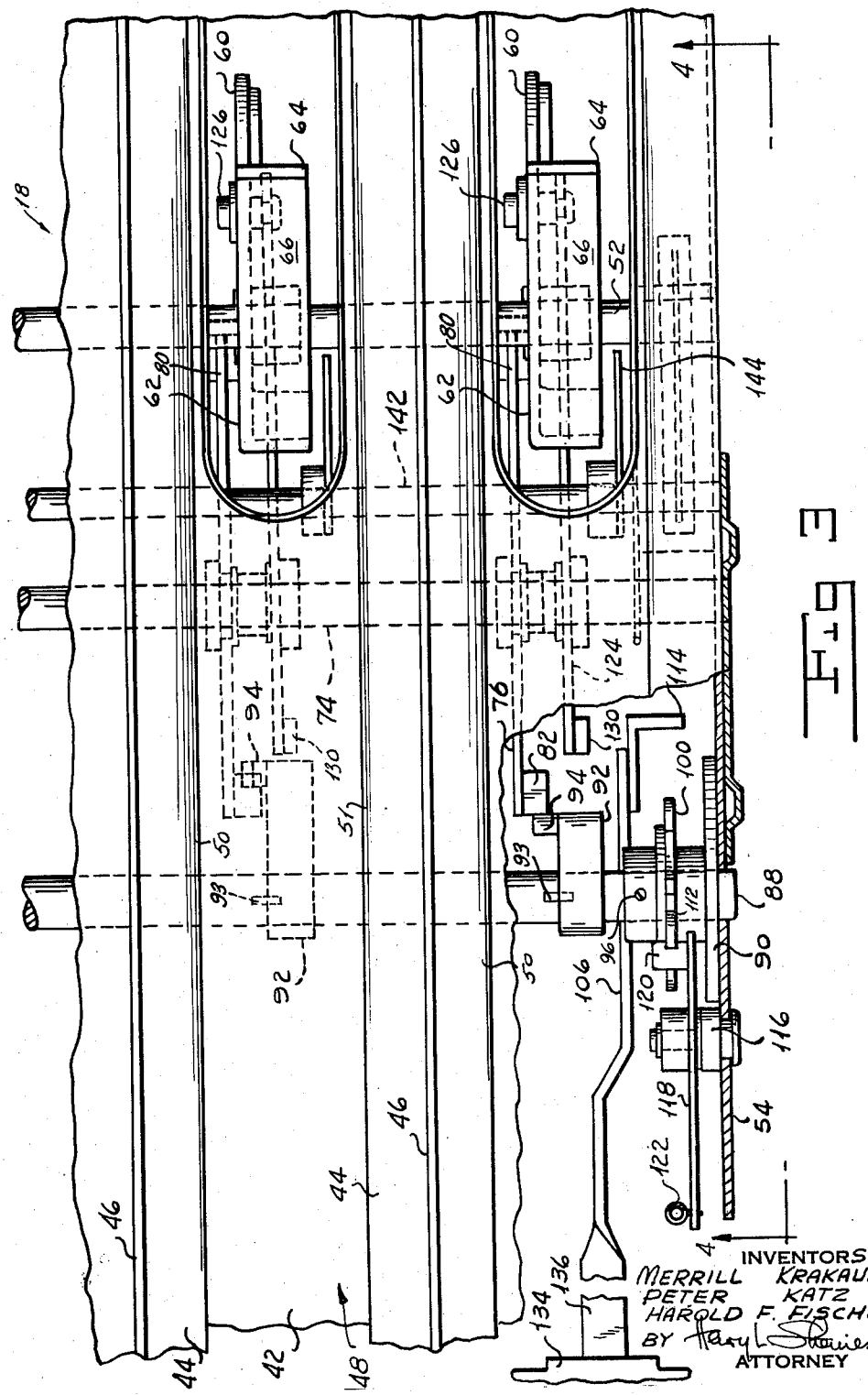

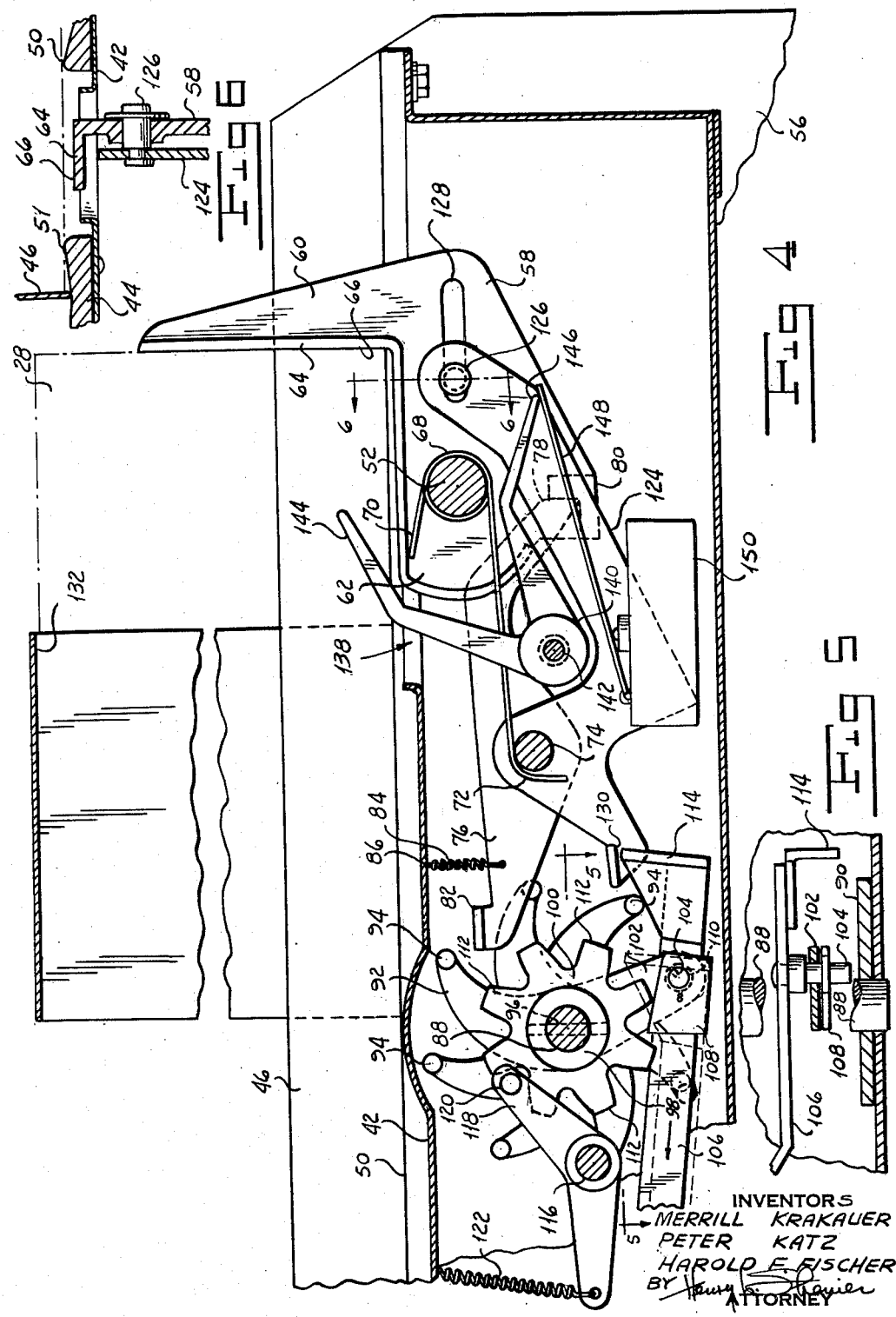

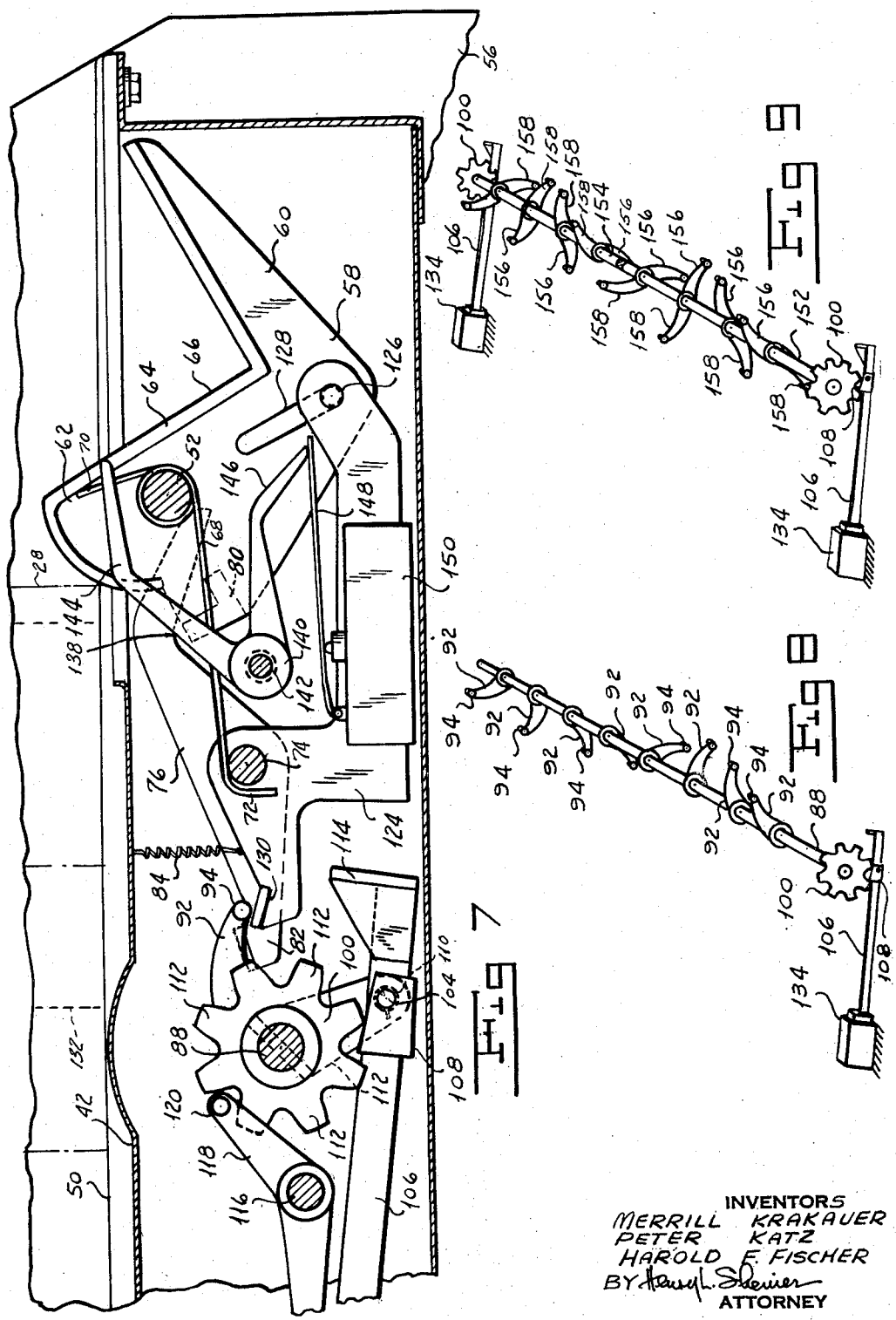

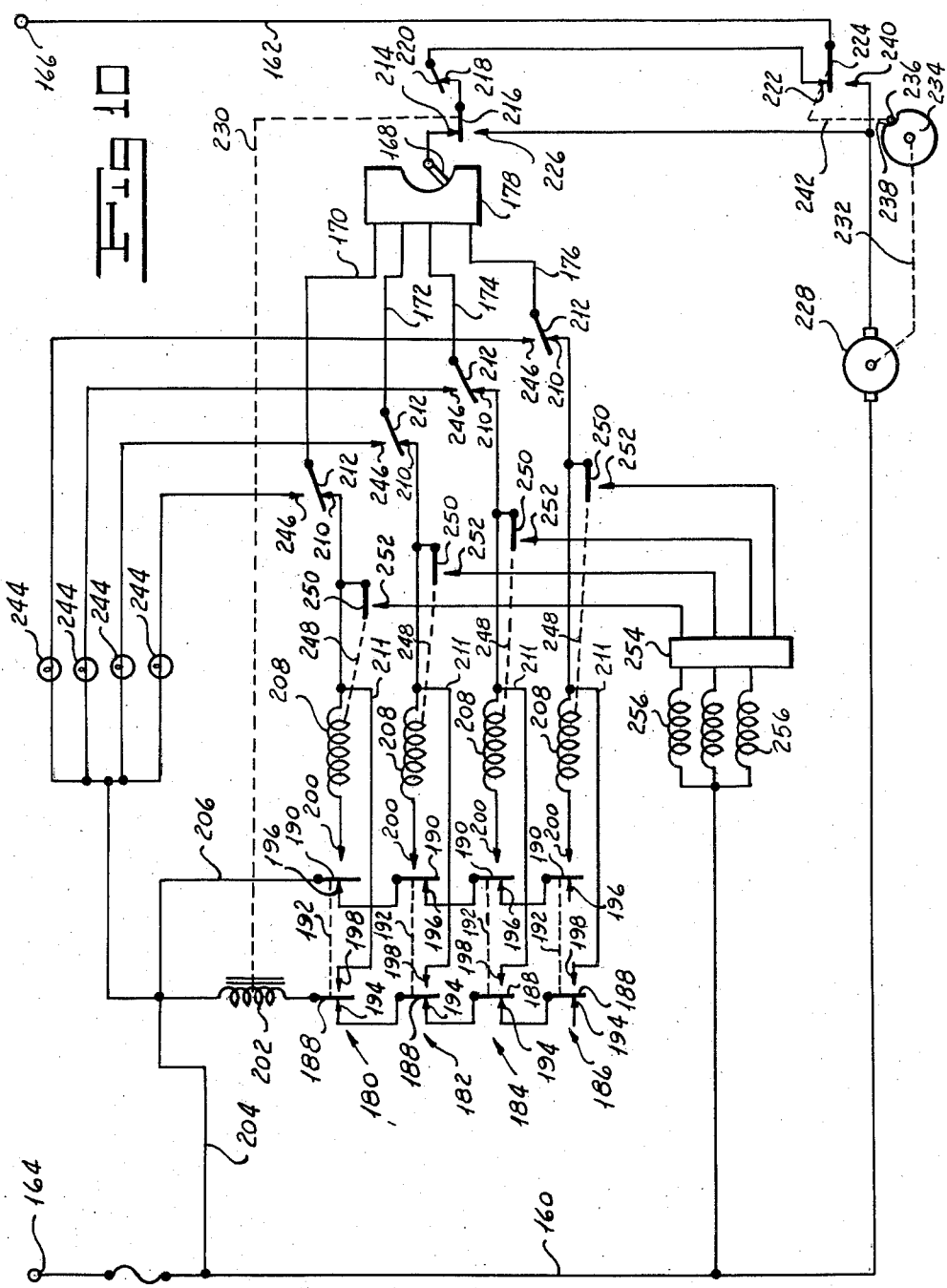

United States Patent Office 3,055,544
Patented Sept. 25, 1962

3,055,544
MULTILEVEL GRAVITY-FEED PACKAGE-MERCHANDISING MACHINE
Merrill Krakauer and Peter Katz, Livingston, and Harold F. Fischer, Morristown, N.J., assignors to Rowe Manufacturing Company, Incorporated, Whippany, N.J., a corporation of New York
Filed Oct. 20, 1958, Ser. No. 768,136
13 Claims. (Cl. 221—14)

Our invention relates to a multilevel, gravity-feed, package-merchandising machine and more particularly to an improved, gravity-feed, package-merchandising machine which is less expensive than and more efficient than are the machines of the prior art.

Merchandising machines of the prior art for dispensing merchandise in packages, such as beverages in cartons, generally employ pusher-bar for advancing rows of cartons toward sequentially-released, trap doors. A heavy drive motor is required for the pusher-bar since it must advance the entire supply of cartons an one level of the machine. This drive motor and its associated linkage add to the expense of constructing the machine and make the machine expensive to operate, since the motor consumes a large amount of electrical power.

It has been suggested that rows of cartons may be fed under the influence of gravity toward a row of dispensing members which normally prevent cartons from falling off the end of the platform or chute and which are operated to lift the cartons of a row in sequence off the platform to dispense the cartons. While a machine of this type does not require a drive motor for a pusher-bar, it employs a relatively heavy drive motor which must lift the cartons as they are dispensed. This heavy drive motor adds both to the cost of building the machine and to the cost of operating the machine.

In the course of a cycle of operation of a merchandising machine of the prior art, the dispensing means not only is actuated, but it is reset in the same cycle. It will be appreciated that this requirement for resetting the dispensing mechanism on each cycle increases the time required to complete the cycle.

Where cartoned beverages are being dispensed, tumbling of the cartons into the delivery chute of a machine of the prior art causes some cartons to be broken open, with the result that the contents spill. Machines of the prior art employ relatively complicated mechanisms having moving parts for preventing a dishonest person from obtaining merchandise without payment by tilting the machine. The moving parts of these antitilt mechanisms may become stuck or jammed and thus cease to function.

We have invented a multilevel, gravity-feed package-merchandising machine which overcomes the disadvantages of machines of the prior art discussed hereinabove. Our machine relies on a spring and on the weight of a carton to operate the dispensing mechanism, with the result that only a simple solenoid motor need be employed to initiate a dispensing operation. Owing to the fact that a simple solenoid release mechanism is used, our machine is less expensive to construct and less expensive to operate than are machines of the prior art. An actuated dispensing means is not reset in the same cycle in which it is actuated in our machine. Rather, the dispensing means which had been actuated in the course of the preceding cycle of operation is reset in the course of the dispensing operation of the next cycle. In this manner our machine shortens the time required to complete a cycle of its operation. Our machine delivers cartons of merchandise to the delivery opening of the machine without tumbling to reduce the danger that the cartons might be broken open in the course of delivery. Our machine employs an extremely simple antitilt mechanism which has no moving parts which might become stuck or jammed and cease to function.

Merchandising machines of the prior art include a number of levels, each of which is adapted to dispense only one kind of merchandise. One level of our machine may be arranged to dispense two kinds of merchandise to afford two selections.

One object of our invention is to provide a multilevel, gravity-feed, package-merchandising machine which is less expensive to construct and which is less expensive to operate than are machines of the prior art.

Another object of our invention is to provide a multilevel, gravity-feed, package-merchandising machine which has a shorter cycle of operation than do machines of the prior art.

A further object of our invention is to provide a multilevel, gravity-feed, package-merchandising machine which dispenses cartons without tumbling.

A still further object of our invention is to provide a multilevel, gravity-feed, package-merchandising machine which employs a very simple antitilt mechanism having no moving parts.

Yet another object of our invention is to provide a multilevel, gravity-feed, package-merchandising machine, one level of which may be arranged to afford two selections.

Other and further objects of our invention will appear from the following description.

In general our invention contemplates the provision of a multilevel, gravity-feed, package-merchandising machine, each level of which has an inclined platform formed with a number of chutes along which articles of merchandise are adapted to slide toward the delivery chute of the machine. We mount a plurality of respective escapement cradles between the platform chutes and the delivery chute in positions to receive articles of merchandise from the platform. Each cradle is adapted to rock from the position at which it receives an article of merchandise to a position at which a received article is permitted to move into the delivery chute. In either of its positions the cradle retains the articles, other than the article being dispensed, on the platform. Respective springs normally urge the cradles to move to permit articles of merchandise to fall into the delivery chute. We provide respective locking means which restrain the cradles against movement under the influence of the springs to hold the cradles in positions at which they receive articles of merchandise from the platform. Our machine has means for sequentially releasing the locking means in response to the deposit of coins in the machine and to the operation of a selecting means to dispense articles of merchandise. We arrange our machine to reset a previously operated cradle during the next succeeding dispensing operation. If desired, we may arrange a level of our machine to dispense two different kinds of merchandise.

In the accompanying drawings which form part of the instant specification and which are to be read in conjunction therewith and in which like reference numerals are used to indicate like parts in the various views:

FIGURE 1 is a fragmentary, front elevation of our multilevel, gravity-feed, package-merchandising machine with the door broken away to show the arrangement of the various levels of the machine.

FIGURE 2 is a sectional view of our multilevel, gravity-feed, package-merchandising machine taken along the line 2—2 of FIGURE 1.

FIGURE 3 is a fragmentary, plan view of one of the levels of our multilevel, gravity-feed, package-merchandising machine with parts broken away and with other parts in section.

FIGURE 4 is a fragmentary, sectional view of our multilevel, gravity-feed, package-merchandising machine taken along the line 4—4 of FIGURE 3.

FIGURE 5 is a fragmentary, sectional view of our multilevel, gravity-feed, package-merchandising machine taken along the line 5—5 of FIGURE 4.

FIGURE 6 is a fragmentary, sectional view of our multilevel, gravity-feed, package-merchandising machine taken along the line 6—6 of FIGURE 4.

FIGURE 7 is a sectional view similar to FIGURE 4 showing the positions of the parts of the dispensing actuating mechanism immediately following a dispensing operation.

FIGURE 8 is a schematic view in perspective of one form of dispensing actuating means which may be employed in our multilevel, gravity-feed, package-merchandising machine.

FIGURE 9 is a schematic view in perspective of an alternate form of dispensing actuating means which may be employed when a level of our multilevel, gravity-feed, package-merchandising machine is arranged to dispense two kinds of merchandise.

FIGURE 10 is a schematic view of one form of control circuit which may be employed with our multilevel, gravity-feed, package-merchandising machine.

Referring now to FIGURES 1 and 2 of the drawings, our multilevel, gravity-feed, package-merchandising machine, indicated generally by the reference character 10, has a cabinet 12 provided with a door 14 connected to the cabinet by a hinge 16. In the form of our machine shown, three dispensing levels, indicated generally respectively by the reference characters 18, 20, and 22, are supported within the cabinet 12 by respective pairs of brackets 24 and 26 secured within the cabinet 12 by any convenient means. We so arrange the brackets 24 and 26 that each level inclines downwardly to the right as viewed in FIGURE 1 to permit articles 28 of merchandise to move downwardly to the right under the influence of gravity toward a dispensing chute, indicated generally by the reference character 30, through which a dispensed article falls to a delivery tray 32 provided with a handle 34 by means of which the tray may be pulled out to permit the customer to withdraw the article. We provide the door 14 with a coin slot 36 through which coins may be inserted into a coin register 38 carried by the door. A coin-return opening 40 formed in door 14 permits a customer to withdraw coins from the machine in the event he operates the coin-return mechanism, to be described hereinafter, before deposited coins have been accepted.

Since the levels 18, 20, and 22 of our machine are identical, we will describe only the level 18 in detail. As can be seen by reference to FIGURES 1 to 3 of the drawings, level 18 includes a platform 42 to which we secure the bases 44 of a number of partitions 46 which divide the platform 42 into a number of inclined chutes indicated generally by the reference character 48.

Referring now to FIGURE 6 the base 44 of each partition 46 is so formed that it provides a pair of tracks 50 and 51 on which the bottoms of the cartons 28 rest. The tracks 50 and 51 in each chute 48 provide only a limited area of contact between the tracks and the bottoms of the cartons disposed in the chutes 48 to reduce the frictional restraining force on the cartons. The angle of inclination of the platform 42 is such that the cartons 28 may slide freely along the tracks 50 and 51 towards the delivery chute 30.

Referring to FIGURES 1 to 4 and 7, a pivot shaft 52 carried by and fixed to the respective end plates 54 and 56 of the unit 18 rotatably carries a plurality of respective escapement cradles 58 associated with the respective platform chutes 48. Each cradle 58 includes a first arm 60 and a second arm 62. We form a flange 64 along one edge of each of the arms 60 and 62 to provide a carton engaging surface 66 which is adapted to receive a carton 28 from its associated chute 48. A plurality of springs 68 carried by shaft 52 normally urge the respective cradles 58 to positions at which the cartons 28 received by the cradles are delivered into the chute 30. One end 70 of a spring 68 engages the underside of the flange 64 and the other end 72 engages a pivot shaft 74 supported by and fixed to the end plates 54 and 56. Springs 68 tend normally to uncoil to urge the respective cradles 58 to rotate in a clockwise direction as viewed in FIGURE 4.

Shaft 74 rotatably supports a plurality of locking levers 76 associated with the respective cradles 58. Before a dispensing operation is initiated in a manner to be described, one end 78 of each lever 76 engages an L-shaped stop lug 80 carried by the associaed cradle 58. We form the end of each lever 76 remote from the end 78 with an offset lug 82 adapted to be struck, in a manner to be described, to release the cradle 58. Respective springs 84 secured to levers 76 and to respective hooks or the like 86 carried by the underside of platform 42 normally urge each lever 76 to rotate in a clockwise direction as viewed in FIGURE 4 to its locking position.

A shaft 88 rotatably supported by any convenient means such as by a pair of bearing plates 90, one of which is shown in FIGURE 3, carries for rotation with the shaft by any convenient means such as keys 93 or the like a plurality of tripping cranks 92 associated with the respective platform chutes 48. We mount a pin 94 on the end of each respective crank 92 in a position to strike the lug 82 of the corresponding lever 76 as shaft 88 rotates in a clockwise direction as viewed in FIGURE 4. In one form of our invention, as can be seen by reference to FIGURES 4 and 8, cranks 92 are spaced along shaft 88 at locations corresponding to the respective platform chutes 48. We space the cranks 92 around shaft 88 so that the pins 94 successively actuate the respective locking levers 76 in the course of one revolution of shaft 88.

Upon a step of movement of shaft 88 about its axis, a pin 94 on an arm 92 strikes a lug 82 to pivot the corresponding lever 76 in a counterclockwise direction, as viewed in FIGURE 4. This action moves the end 78 of the lever 76 out of engagement with the stop lug 80 to permit the corresponding spring 68 to drive the cradle 58 in a counterclockwise direction to the position shown in FIGURE 7. Owing to the connection between the cradle 58 and the lever 124 provided by the pin 126 and by the slot 128, the lever 124 pivots in a clockwise direction from the position shown in FIGURE 4 to the position shown in FIGURE 7. Upon the next operation of the machine, with the parts in the relative positions shown in FIGURE 7, as shaft 88 is displaced through one step of revolution, an arm 92 engages the lug 130 to pivot the lever 124 in a counterclockwise direction as viewed in FIGURE 7. As a result, again owing to the connection between the cradle 58 and the lever 124 provided by the pin 126 and by the slot 128, the cradle moves in a counterclockwise direction against the action of spring 68 to its erected position. At the same time spring 84 moves the lever 76 in a clockwise direction to the position at which its end 78 is disposed in the lug 80. In this manner the parts return to the position shown in FIGURE 4. It is to be understood that after a cradle has been released, its spring 68 is sufficiently strong to overcome the action of spring 84 to move the lever 76 from the position shown in FIGURE 4 to the position shown in FIGURE 7 against the action of the spring 84. It will be understood further that after a pin 94 strikes a lug 82 as shaft 88 moves through a step of revolution to unlock the associated cradle after its initial movement, it rides off the lug 82 to permit the cradle to assume control of the lever 76 as the lug 80 engages the underside of the lever to move it to the position shown in FIGURE 7.

A pin 96 passes through the hub 98 of a ratchet wheel 100 to support the wheel on shaft 88 for rotation with the shaft. A link 102 loosely carried by shaft 88 carries a pin 104 at its end remote from shaft 88. We pivotally support a solenoid bar 106 on pin 104. A pawl 108 rotatably carried by pin 104 is normally urged by a spring 110 carried by pin 104 to a position at which the pawl bears against a tooth 112 of wheel 100. Spring 110 may be arranged so that it normally tends to uncoil in a clockwise direction as viewed in FIGURE 4. Thus with the ends of the spring secured respectively to link 102 and to the pawl 108, the spring normally urges the pawl to move in a clockwise direction to bear against a tooth 112. As bar 106 moves to the left as viewed in FIGURE 4, in a manner to be described, pawl 108 strikes a tooth 112 of wheel 100 to rotate shaft 88. When bar 106 moves to the left, as viewed in FIGURE 4, link 102 turns on shaft 88 and as the link moves pawl 108 is moved by spring 110 to a position at which it engages and drives a tooth 112. Pawl 108 rides under a tooth 112 when the bar moves to the right, as viewed in FIGURE 4, after a dispensing operation is initiated. We form each of the bars 106 with an offset lug 114 to prevent wheel 100 from overriding, upon its actuation. When bar 106 moves to the left as viewed in FIGURE 4, in a manner to be described, lug 114 is in a position in the path of a tooth 112 to prevent excess movement of wheel 100, as shown in broken lines in FIGURE 4.

A pivot shaft 116 supported by and fixed to side panel 54 rotatably carries a detent 118, one arm of which carries a pin 120. A spring 122 extending between the other detent arm and the underside of the platform 42 normally urges the detent 118 to a position at which the pin 120 is disposed between adjacent teeth 112 of the wheel 100 properly to position the wheel between the dispensing operations.

From the structure thus far described, it will be seen that as bar 106 moves to the left in a manner to be described, pawl 108 engages a tooth 112 to drive wheel 100. As the wheel starts to turn, pin 120 is knocked out of its position between adjacent teeth against the action of spring 122. The inertia of the wheel 100 maintains rotation of the wheel until pin 120 drops into the space between the next pair of adjacent teeth 112. As bar 106 moves to the left, lug 114 is in a position in the path of a tooth 112 to prevent wheel 100 from overriding before pin 120 drops into a succeeding space between teeth 112. When bar 106 returns to the right, pawl 108 rides under a tooth 112 of wheel 100. We provide wheel 110 with a number of teeth 112 equal to the number of cranks 92 carried by shaft 88. It will be remembered that the number of cranks 92 equals the number of chutes 48 provided on the level such, for example, as level 18. In the specific form of invention shown, wheel 100 has eight teeth, with the result that shaft 88 steps through 45° of rotation on each actuation of the wheel. The spacing of cranks 92 around shaft 88 is such that the locking levers 76 associated with the respective chutes 48 are successively actuated in the course of one revolution of shaft 88.

Referring now to FIGURES 4 to 7, when wheel 100 is driven through a step of revolution, one of the crankpins 94 strikes the associated lug 82 to release a locking lever 76 to permit spring 68 and the weight of a carton to move the escapement cradle 58 to a position at which an article of merchandise is delivered to chute 30. In FIGURE 7 we have shown the cradle 58 in the position it occupies after a carton has been delivered into the chute. We provide our machine with a mechanism for resetting an operated cradle 58 on the next succeeding dispensing cycle following that in which the cradle was operated. Shaft 74 pivotally supports a plurality of respective reset levers 124, one end of each of which carries a pin 126 which rides in a slot 128 formed in the associated cradle 58. We form the end of each lever 124 remote from pin 126 with an offset lug 130 adapted to be struck by the pin 94 associated with the lever 124 in the cycle of operation following that cycle in which the corresponding escapement cradle was operated. When a particular escapement cradle is operated to dispense a received carton, lever 124 moves from the position shown in FIGURE 4 to the position shown in FIGURE 7 under the action of the driving connection provided by pin 126 and slot 128. In this position of the lever, lug 130 is adapted to be struck by the associated pin 94 during the next succeeding operation. During this next succeeding operation the arm carrying the associated pin strikes lug 130 to move lever 124 in a counterclockwise direction as viewed in FIGURE 7 to move the escapement cradle 58 back to its initial position. In the position of the cradle shown in FIGURE 7, after a received carton has been delivered, arm 62 of the cradle is in a position to prevent movement of the remaining cartons downwardly along the chute. When the cradle returns to its initial position shown in FIGURE 4 in the course of the next dispensing operation, the cartons slide down the tracks 50 and 51 and cradle 58 receives the next carton to be dispensed.

We provide each of the levels with an anti-tilt bar 132 extending over the platform adjacent its delivery end. Conveniently, this bar 132 may be formed by a piece of sheet metal bent over the top of the platform with its sides secured to the side plates 54 and 56 in any convenient manner. This bar prevents cartons, which are sliding down toward the retaining arm 62 of a cradle 58 which has previously been actuated, from tumbling over the arm into the chute. Referring now to FIGURES 1 and 2, we pivotally mount respective baffles 258 and 260 within cabinet 12 on pins 262 and 264 carried by brackets 266 and 268 secured to the cabinet. Respective springs 269 and 272 normally urge baffles 258 and 260 to the horizontal or full-line position shown in FIGURE 2. A stationary baffle 270 below the various dispensing levels guides dispensed articles to the delivery tray 32. An article dispensed from the level 18 is delivered to baffle 258 in chute 30. Under the influence of the weight of the article, the baffle 258 moves against the action of the spring 269 to the broken-line position shown in FIGURE 2 to permit the article to slide down and off the baffle to be received by the baffle 260. When baffle 260 receives the article, it pivots under the influence of the weight of the article against the action of spring 272 to the broken-line position shown in FIGURE 2. The article then slides down and off baffle 260 to the stationary baffle 270 along which it slides to the delivery tray 32. It will be appreciated that an article dispensed from level 20 engages only baffles 260 and 270, while an article dispensed from level 22 is delivered directly to baffle 270.

Referring now to FIGURES 1 and 3, we mount a solenoid 134 on the side plate 54 of each of the levels 18, 20, and 22. Solenoids 134 have respective armatures 136 which are formed integrally with or otherwise secured to the respective bars 106. When the windings of solenoids 134 are energized, armatures 136 are drawn into the windings and bars 106 move to the left as viewed in FIGURES 3 and 4. When the solenoids are de-energized, any suitable means such as springs or the like return bars 106 and armatures 136 to their initial positions.

Referring again to FIGURES 4 and 7, we provide each of the levels of our machine with means for indicating when the supply of articles on the level is exhausted. An empty-signal bell crank, indicated generally by the reference character 138, has a hub 140 rotatably supported on a shaft or pivot pin 142 carried by plate 54 for example. We form the bell crank 138 with a first arm 144 and with a second arm 146 adapted to be engaged by the spring actuating arm 148 of an empty-signal switch 150 carried by plate 54. In the absence of any cartons in the last chute 48 from which cartons are dispensed, on a particular level the associated spring arm 148 urges bell crank 138 to the position shown in FIGURE 4, at which position arm 144 extends upwardly into the platform chute. In this position of the bell crank 138 switch 150 is in a condition in which the circuit to the corresponding solenoid cannot be completed and in which a circuit to an empty-signal light is completed in a manner to be described hereinafter. With a carton in place on the escapement lever associated with the last chute from which cartons are dispensed on the particular level being considered, bell crank 138 occupies the position shown in FIGURE 7, at which switch 150 is in a condition to permit completion of the delivery solenoid circuit and in which the empty-signal light circuit is open. During the period of time between the cycle of operation in which a carton is dispensed from the platform chute with which crank 138 is associated and the next dispensing cycle, crank 138 will be held in the position shown in FIGURE 7 by the next carton to be dispensed. Thus no false indication will be given by the machine during this time.

Referring now to FIGURE 9, in an alternate form of our machine we may desire to provide two selections for a level of our machine. In this case we replace the shaft 88 with a pair of axially aligned shafts 152 and 154, each of which carries for rotation with the shaft at its outboard end a respective ratchet wheel 100 and associated pawl 108, bar 106, and solenoid 134. We mount a plurality of respective double cranks each having a pair of diametrically oppositely extending arms 156 and 158 at spaced locations along the shafts 154 and 156. One double crank is provided for each platform chute associated with the particular shaft 152 or 154. We space the double cranks around shaft 152 or 154 in such a manner that the cradles 58 associated with the shaft are operated in sequence. In this case, however, for a single revolution of one of the shafts 152 or 154 each of the associated cradles is operated twice. In this way we afford two selections for a level of the machine.

Referring now to FIGURE 10, one form of electric circuit which may be employed with our machine includes respective conductors 160 and 162 connected to the terminals 164 and 166 of a suitable source of electrical energy. The coin totalizer 38 of our machine, as is known in the art, has a contact arm 168 adapted to be stepped in response to the deposit of coins in the register to engage one of a plurality of price contacts (not shown) to energize a price line (not shown) corresponding to the sum in coins deposited in the machine. We connect respective conductors 170, 172, 174, and 176 of our machine to certain of the price lines in accordance with the prices at which it is desired to sell the various articles of merchandise contained in the respective levels or split levels of our machine. For purposes of simplicity, we have indicated the price contacts, price lines, and the connections of conductors 170, 172, 174 and 176 to the price lines schematically as a totalizer plate 178 in FIGURE 10.

In FIGURE 10 we have indicated, by way of example, a control circuit which may be used to afford four different selections. This form of our control circuit includes four selector switches indicated generally respectively by the reference characters 180, 182, 184, and 186. Each of the selector switches includes respective contact arms 188 and 190 connected by a mechanical linkage 192. Before actuation, the respective arms 188 and 190 of each switch engage contacts 194 and 196. Upon actuation of a selector switch, arms 188 and 190 engage respective contacts 198 and 200. In order to prevent energization of more than one delivery solenoid at a time, we connect the contacts 194 of the respective switches 180, 182, and 184 to the arms 188 of the respective switches 182, 184, and 186. In a similar manner we connect the contacts 196 of switches 180, 182, and 184 to the respective arms 190 of switches 182, 184, and 186.

We connect an unlatching-solenoid winding 202 between a conductor 204 connected to conductor 160 and the contact arm 188 of switch 180. A conductor 206 connects arm 190 of switch 180 to conductor 204. We connect the respective windings 208 associated with solenoids 134 between the contacts 200 of the respective selecting switches and contacts 210 of the empty-signal switches 150 associated with the respective levels. Respective conductors 211 connect contacts 198 to contacts 210 of the empty-signal switches. Switches 150 include contact arms 212 connected to the respective conductors 170, 172, 174, and 176. With articles of merchandise in all levels, arms 212 engage contacts 210. We connect one contact 214 of a motor-start switch including an arm 216 normally in engagement with contact 214 to the totalizer arm 168. We connect a normally-closed, coin-return switch including a contact 218 and a contact arm 220 between contact arm 216 and one contact of a motor-circuit-holding switch contact 222. The motor-holding-circuit switch arm 224 normally engages contact 222 to connect the contact to conductor 162. From the circuitry just described, it will be seen that before money is deposited in the totalizer and before a selection is made, a circuit is complete from arm 168 to conductor 162.

When a customer desires to purchase an article corresponding to selector switch 180, for example, he deposits a sum in coins equal to the purchase price in the coin register 38. As a result, totalizer arm 168 moves to engage a contact corresponding to the purchase price to complete the circuit from conductor 162 to conductor 170. The customer next actuates switch 180 to move contact arms 188 and 190 into engagement with contacts 198 and 200. This action completes the circuit of the unlatching-solenoid 202 from conductor 160 through conductor 204, solenoid winding 202, arm 188 and contact 198 of switch 180, conductor 211, contact 210 and arm 212 to conductor 170 which, as has been explained hereinabove, is connected to conductor 162. This action also completes the circuit of the delivery-solenoid winding 208 associated with switch 180 from conductor 160 through conductor 204, conductor 206, arm 190 and contact 200 of switch 180, winding 208, contact 210 and arm 212 to conductor 170 which is connected to conductor 162.

Energization of the unlatching-solenoid 202 in the manner described hereinabove frees the coin-return-lock assembly (not shown) to actuate the motor-start switch arm 216 to move it out of engagement with contact 214 and into engagement with a contact 226 connected to one terminal of the coin-register motor 228, the other terminal of which is connected to conductor 160. For purposes of simplicity, we have indicated the relationship between the solenoid 202 and the motor-start switch arm 216 schematically as a mechanical connection 230.

When the motor circuit is complete in the manner described through contact 226 and arm 216, the motor begins to rotate to drive its shaft, indicated schematically by the linkage 232, to move a cam 234 to drive a follower 236 out of the cam recess 238 to cause switch arm 224 to leave contact 222 and to engage a contact 240 connected to the motor terminal to which contact 226 is connected. The connection between follower 236 and arm 224 is indicated schematically by the linkage 242. When this occurs, the coin-return switch including arm 220 is by-passed and operation of the switch will not interrupt the motor circuit. Motor 228 continues to rotate to accept the deposited coins and to reset arm 168 in a manner known to the art.

We connect a plurality of respective empty-signal lamps 244 in parallel between the common terminal of conductors 204 and 206 and respective contacts 246 associated with empty-signal-switch arms 212. If the supply in any level is exhausted, the corresponding arm 212 is out of engagement with the corresponding contact 210 and in engagement with the corresponding contact 246. In this condition of an empty-signal switch 150, the deposit of money in the register and operation of a selecting switch will not result in energization of the unlatching-solenoid 202 or of the associated delivery-solenoid winding 208.

Each of the delivery-solenoid windings, upon its energization, operates a linkage 248 to cause a change-switch-contact arm 250 to engage a contact 252 connected to a panel 254 through which the contact 252 is connected to a predetermined one of the number of change-maker-solenoid windings 256 connected in parallel to conductor 160. The connections of contacts 252 through panel 254 to the change-maker-solenoid windings 256 is accomplished in a manner known to the art to give the correct sum in change to the customer as required.

In operation of our multilevel, gravity-feed, package-merchandising machine a customer desiring to purchase an article contained in one of the levels deposits a sum in coins corresponding to the price of the article into the coin register 38 through slot 36. Assuming the desired article is contained in the level corresponding to switch 182, the totalizer arm 168 moves to a position to complete the circuit of conductor 172. Upon actuation of switch 182, the circuit of the corresponding delivery-solenoid winding 208 is complete and the circuit of the unlatching-solenoid winding 202 is complete. Energization of the unlatching-solenoid winding frees the coin-return-lock mechanism (not shown) to cause contact arm 216 to engage contact 226 to energize motor 228, which operates in a manner known to the art, to accept deposited money and to reset arm 168. Once the motor starts operating, the coin-return mechanism is disabled.

Upon energization of winding 208, the solenoid 134 moves the associated bar 106 to the left, as viewed in FIGURE 4, to cause pawl 108 to drive wheel 100 in a clockwise direction to cause the crank 92 associated with one of the platform chutes to strike the lug on a locking lever 76 to release the corresponding cradle 58. When this occurs, spring 68, together with the weight of the carton being dispensed, moves the cradle to the position shown in FIGURE 7 and the carton 28 is delivered to chute 30. Assuming that the article comes from level 18, it slides successively down baffles 258, 260 and 270 to tray 32 to be delivered to the customer without tumbling.

When the dispensing operation is complete, the parts occupy the relative positions shown in FIGURE 7. When the next dispensing cycle is initiated, the parts operate in the manner described hereinabove to deliver a carton from the next succeeding platform chute 48. In the course of this next operation, the crank 92 associated with the previously operated dispensing mechanism strikes lug 130 to rotate resetting lever 124 in a counterclockwise direction, as viewed in FIGURE 7, to return the parts of the previously-actuated cradle 58 to its initial position shown in FIGURE 4.

In the event that a supply of cartons on a particular level is exhausted, bell crank 138 moves, under the action of spring 148, to the position shown in FIGURE 4. As a result of this movement, the corresponding switch arm 212 moves out of engagement with contact 210 and into engagement with contact 246. Thus, when a sum in coins aggregating the purchase price of an article contained in this level is deposited in the machine, the empty-signal lamp 224 associated with this level lights to inform the customer that this level is empty. At the same time, the selecting circuit associated with the level is disabled so that a customer cannot make futile selection from the level in which he would lose the deposited coins.

In the event that it is desired to provide more than one selection for a particular level, a pair of shafts 152 and 154 may be substituted for the shaft 88. In this case, each shaft carries a plurality of double cranks which actuate for associated delivery mechanisms twice for each revolution of the shaft 152 or 154.

It will be seen that we have accomplished the objects of our invention. Our multilevel, gravity-feed, package-merchandising machine has a dispensing member which is driven by the weight of a carton acting with a biasing spring associated with the dispensing member. Our machine does not require an expensive, heavy-duty, drive motor either for advancing articles or for operating the dispensing means. Rather, it employs only a simple, solenoid drive which is required only to release a locking member. Our machine delivers articles to a customer without tumbling the articles of merchandise. Our machine is less expensive both to construct and to operate than are machines of the prior art. Our machine has a shorter cycle than machines of the prior art owing to the fact that the actuated dispensing mechanism need not be reset in the same cycle in which it is actuated. We may arrange our machine to provide more than a single selection on one level of the machine.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A merchandising machine for dispensing articles of merchandise including in combination an inclined chute for supporting articles of merchandise, said chute having a delivery end toward which articles are adapted to slide under the influence of gravity, a dispensing member adapted to receive an article of merchandise from said chute, means mounting said dispensing member adjacent the delivery end of the chute for pivotal movement to a first position at which it receives an article from said chute and to a second position at which it dispenses a received article, biasing means acting independently of the weight of articles on said chute normally urging said dispensing member to said second position, means for locking said dispensing member in said first position against the action of said biasing means and means for releasing said locking means to permit said dispensing member to move to said first position.

2. A merchandising machine for dispensing articles of merchandise including in combination an inclined chute for supporting a supply of articles to be dispensed, said chute having a delivery end toward which said articles are adapted to slide under the influence of gravity, an escapement cradle having an article-receiving surface, means mounting said cradle adjacent said delivery end for pivotal movement to a first position at which its receiving surface receives an article from said chute and to a second position at which said cradle dispenses said article, biasing means acting independently of the weight of articles on said chute normally urging said cradle to move towards said second position, means for locking said cradle in said first position against the action of said biasing means, and means for releasing said locking means to permit said cradle to move to said second position.

3. A merchandising machine as in claim 2 in which said escapement cradle includes a pair of arms forming said article-receiving surface, said arms being disposed substantially at right angles to each other, a first one of said arms being adapted to retain said supply of articles including a received article on said shelf in said first position of said cradle and said second arm being adapted to retain said supply of articles other than said received article on said shelf in said second position of said cradle.

4. A merchandising machine for dispensing articles of merchandise including in combination an inclined chute for supporting a supply of articles to be dispensed, said chute having a delivery end toward which said articles are adapted to slide under the influence of gravity, an escapement cradle, means mounting said cradle adjacent said delivery end for pivotal movement to a first position at which it receives an article from said supply and to a second position at which it dispenses a received article, means acting independently of the weight of articles on said chute normally urging said escapement cradle toward said second position, means for locking said cradle in said first position against the action of said urging means, an actuating member movable in one direction during a machine operation, means for operating said actuating member, means responsive to a first movement of said actuating member in said one direction under the action of said operating means for releasing said locking means to permit said urging means to move said cradle to said second position, and means responsive to a second movement of said actuating member in said one direction under the influence of said operating means for resetting said cradle to said first position.

5. A merchandising machine as in claim 4 in which said locking means comprises a stop carried by said cradle, a lever, means pivotally mounting said lever for movement to a position at which an end of said lever is adapted to engage said stop to hold said cradle in said first position and means normally urging said lever to a position at which said end engages said stop and in which said actuating means includes means for moving said lever against the action of said urging means to move said lever end out of engagement with said stop.

6. A merchandising machine as in claim 4 in which said means responsive to said second operation of the actuating means includes a reset lever, means mounting said reset lever for movement to a first position at which it is clear of said actuating means and to a second position at which it may be acted upon by said actuating means, means providing an operative connection between said cradle and said reset lever for positioning said reset lever in its first position when said cradle occupies its first position and for moving said reset lever to its second position when said cradle moves to its second position, the arrangement being such that said actuating means drives said reset lever from its second position to its first position during said second operation to move said cradle to its first position to render said locking means effective.

7. A merchandising machine as in claim 4 including an empty lever responsive to the absence of articles on said chute for rendering said operating means inoperative.

8. A merchandising machine for dispensing articles of merchandise including in combination a plurality of inclined chutes for supporting respective supplies of articles of merchandise to be dispensed, each of said chutes having a delivery end toward which articles are adapted to slide under the influence of gravity, a plurality of escapement cradles, means mounting said cradles adjacent the respective delivery ends of said chutes for movement to respective first positions at which they receive articles of merchandise and to second positions at which they dispense received articles of merchandise, respective means acting independently of the weight of articles on said chutes normally urging said cradles to said second positions, respective means for locking said cradles in their first positions against the action of said urging means, means for sequentially releasing said locking means and means for operating said releasing means.

9. A merchandising machine as in claim 8 in which said releasing means includes a shaft and a plurality of cranks carried by said shaft and associated with the respective locking means, said cranks being circumferentially spaced around said shaft to release said locking means sequentially as said shaft steps and in which said operating means includes means for stepping said shaft.

10. A merchandising machine as in claim 8 in which said releasing means includes a shaft and a plurality of pairs of cranks carried by said shaft, said pairs of cranks being associated with the respective locking means, the cranks of each pair extending substantially in diametrically opposite directions, said pairs of cranks being spaced circumferentially on said shaft to release said locking means sequentially twice during one revolution of said shaft and in which said operating means includes means for stepping said shaft.

11. A merchandising machine as in claim 8 in which an escapement cradle corresponding to a released locking means moves to its second position in the course of one operation of said operating means and including means responsive to a succeeding operation of said operating means for resetting said escapement cradle.

12. A merchandising machine as in claim 8 in which said releasing means includes a shaft and in which said operating means includes means for stepping said shaft, means for positioning said shaft between steps and means for preventing overriding of said shaft.

13. A merchandising machine for dispensing articles of merchandise including in combination and inclined chute for supporting articles of merchandise, said chute having a delivery end toward which articles are adapted to slide under the influence of gravity, a dispensing member adapted to receive an article of merchandise from said chute, means mounting said dispensing member adjacent the delivery end of the chute for pivotal movement to a first position at which it receives an article from said chute and to a second position at which it dispenses a received article, means comprising a spring normally urging said dispensing member to said second position, means for locking said dispensing member in said first position against the action of said spring and means for releasing the locking means to permit the dispensing member to move to said second position under the action of said spring.

References Cited in the file of this patent

UNITED STATES PATENTS

| | | |
|---|---|---|
| 842,980 | Sturtevant | Feb. 5, 1907 |
| 976,089 | McAneny | Nov. 15, 1910 |
| 979,318 | Marriott | Dec. 20, 1910 |
| 1,357,631 | Fried | Nov. 2, 1920 |
| 1,462,283 | Hegnes | July 17, 1923 |
| 1,619,006 | Vaughan | Mar. 1, 1927 |
| 2,260,643 | Rosan | Oct. 28, 1941 |
| 2,496,443 | Caruso | Feb. 7, 1950 |
| 2,675,237 | Willcox | Apr. 13, 1953 |
| 2,858,042 | Gabrielson et al. | Oct. 28, 1958 |

FOREIGN PATENTS

| | | |
|---|---|---|
| 491,434 | Italy | Mar. 5, 1954 |